No. 864,944. PATENTED SEPT. 3, 1907.
H. A. BEEKHUIS.
APPARATUS FOR REMOVING THE SKIN FROM FRUIT.
APPLICATION FILED MAY 25, 1904.
3 SHEETS—SHEET 1.
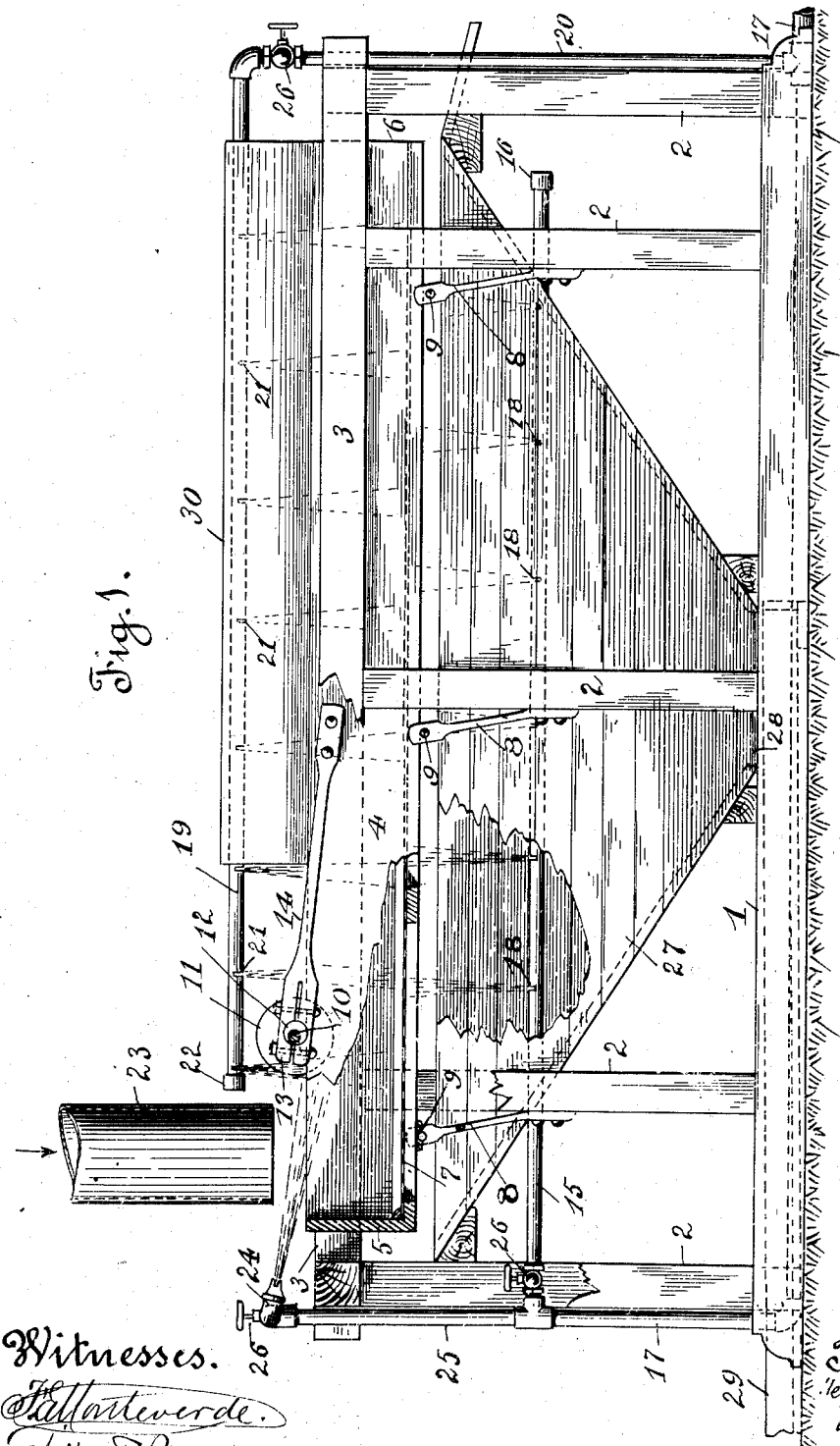

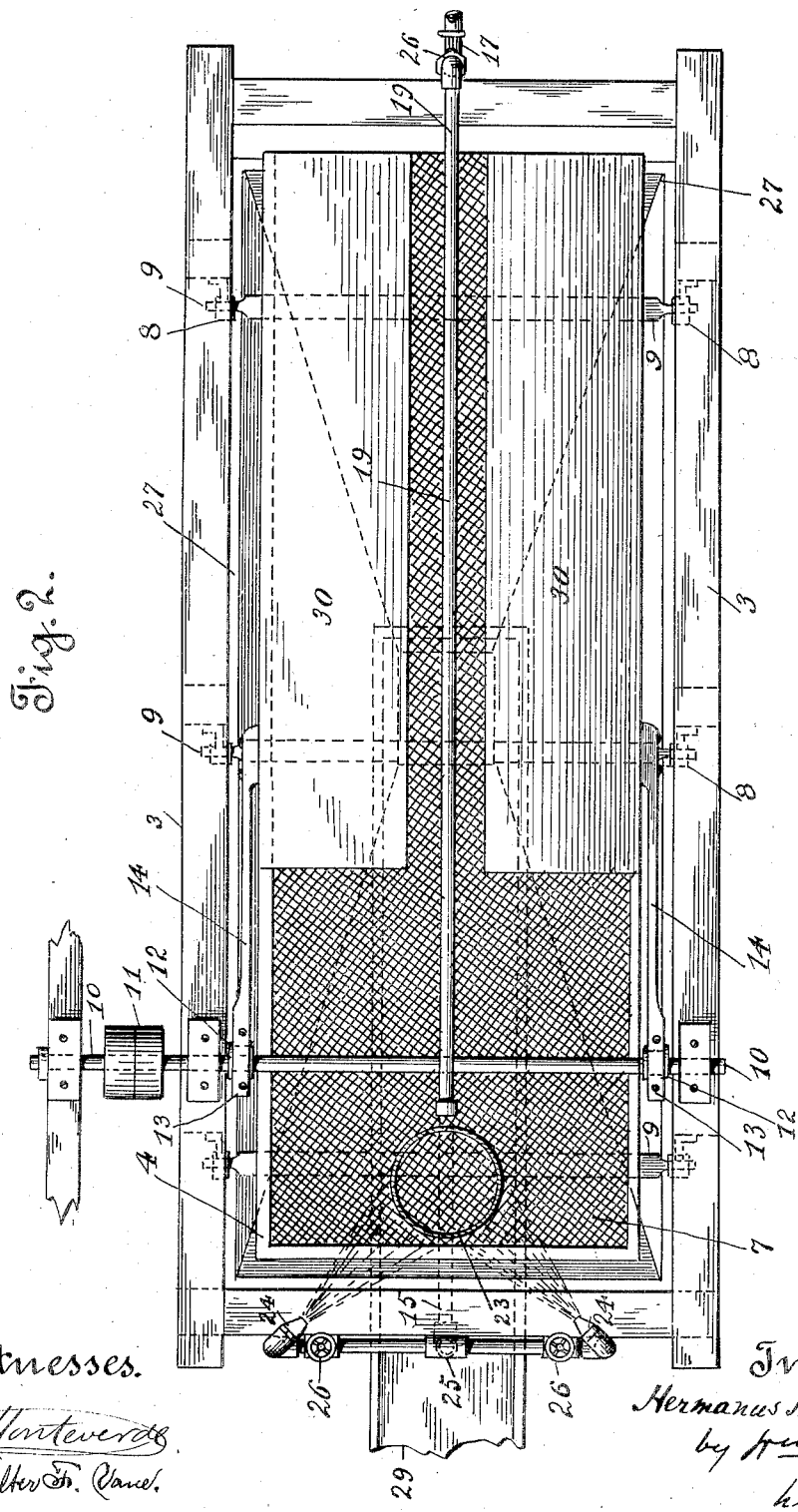

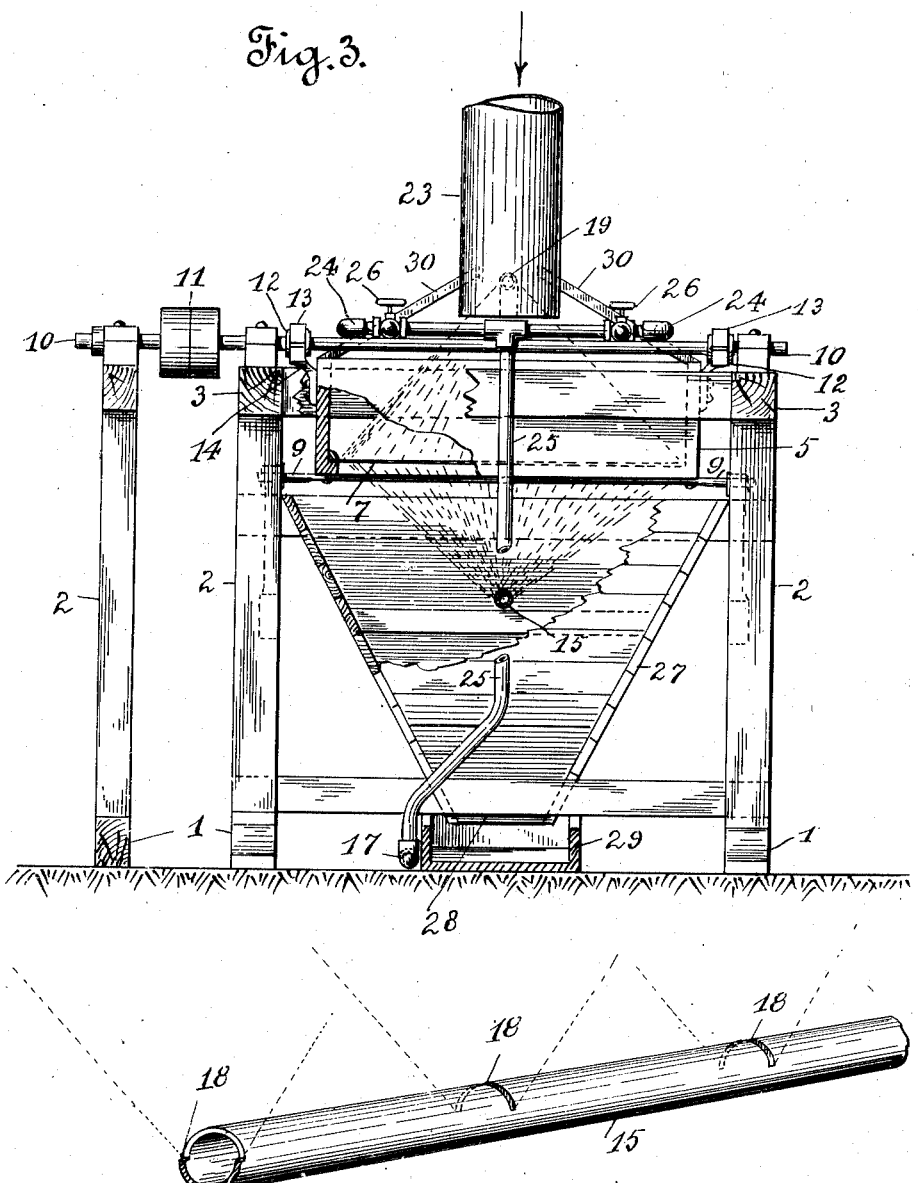

UNITED STATES PATENT OFFICE.

HERMANUS ALBERT BEEKHUIS, OF HANFORD, CALIFORNIA, ASSIGNOR TO CALIFORNIA FRUIT CANNERS ASSOCIATION, OF SAN FRANCISCO, CALIFORNIA, A CORPORATION OF CALIFORNIA.

APPARATUS FOR REMOVING THE SKIN FROM FRUIT.

No. 864,944.      Specification of Letters Patent.      Patented Sept. 3, 1907.

Application filed May 25, 1904. Serial No. 209,648.

*To all whom it may concern:*

Be it known that I, HERMANUS ALBERT BEEKHUIS, a citizen of the United States, residing at Hanford, Kings county, State of California, have invented certain new and useful Improvements in Apparatus for Removing the Skin from Fruit; and I do hereby declare the following to be a full, clear, and exact description of the same.

My invention relates to the class of apparatus for preparing fruit for canning, and especially to devices for removing the skin from the fruit.

Among various machines and processes for removing skin from fruit, there is at present in use an apparatus and process which involve the initial subjection of the fruit to a solution such, for example, as a solution of caustic soda, to disintegrate the skin, and the subsequent brushing of the fruit, whereby the disintegrated skin is removed. In the practice of this general type of process, I have found it better to avoid the use of brushes, both because of their failure to reach every portion of the fruit, particularly the depressed portion or "cup." of the fruit, and because of the tendency which the brushing has to injure or bruise the fruit.

My invention has, therefore, for its object the removal of the previously disintegrated skin of the fruit by a means of a simple and efficient character, capable of reaching every portion of the fruit, and particularly the concavity or depression known as the "cup" of the fruit, which as a rule the brushes fail to reach, said means having no tendency to injure the fruit or bruise it, but, on the contrary, to keep it cool and under the cleansing action of water, avoiding any interval of drying, which would tend to allow the skin-disintegrating solution to have a deleterious effect.

To these ends my invention consists in means for directing jets or sprays of water upon the fruit, the skin of which has been previously disintegrated.

It also consists in the combination of means for shaking said fruit, with means for directing jets or sprays of water upon the fruit while being shaken.

It also consists in the novel combinations and arrangement of devices which I shall hereinafter fully describe.

Referring to the accompanying drawings—Figure 1 is a side view, partly broken, of my apparatus. Fig. 2 is a plan of the same. Fig. 3 is a feed end view, partly broken. Fig. 4 is a detail of the spraying pipe.

The frame of the apparatus or machine, comprises sills 1, suitable uprights 2 and horizontal top pieces 3, supported by the uprights.

4 is a box closed across its feed end 5 and open at its discharge end 6.

The bottom 7 of the box is a screen, as shown. This box is supported within and free of the top of the frame and is carried by spring arms 8 of any suitable character, preferably hickory strips, which said arms are secured at their upper ends to cross rods 9 fastened under the box, and at their lower ends are firmly secured to the uprights 2 of the main frame.

A shaking motion is imparted to the screen box 4, by any suitable means. I have here shown, for the sake of illustration, a power shaft 10 mounted across the head of the main frame and having the usual fast and loose pulleys 11. Upon this power shaft are eccentrics 12 which are fitted with boxes 13 carried by connecting rods 14, the other ends of said rods being connected to the sides of the screen box. By the rotation of the power shaft 10 the screen box 4 is moved back and forth in the direction of its length, and by reason of the spring arms is given a rather quick, jerky and, comparatively, violent shake which will have the effect of not only agitating, shaking or dancing the contents of the box, but of advancing said contents to the open discharge end 6.

Below the box 4, and suitably supported by the main frame is a pipe 15 which is closed by a cap 16 at one end, and has its other end connected in any suitable manner, as by a pipe 17 with a source of water supply, unnecessary to show. This pipe extends in the longitudinal median plane of the machine, and is provided at intervals throughout its length with spraying apertures, of any suitable character. I have found the best form to be that of crosswise slits 18, as shown in Fig. 4. These slits are in the top of the pipe 15 and they direct a fan shaped jet or spray upwardly through the screen bottom of the box 4. A correspondingly disposed pipe 19 lies above the screen box 4, said pipe having a suitable connection, such as 20, with the source of water supply, and being provided on its under side with the crosswise spray slits 21 adapted to direct fan-like jets or sprays down into the screen box from above. This upper pipe 19 is closed at one end by a cap 22.

23 is the feed spout, through which the fruit is delivered into the closed or feed end of the screen box 4.

24 are water jet nozzles, connected by a pipe 25 with the water system, and so located at the head end of the apparatus, as to converge their jets of water, in a fan shape, upon the fruit, as it falls from the feed spout 23 into the box 4. Suitable cocks 26 are placed in the water pipes, by which the water jets or sprays may be used or discontinued, or otherwise controlled, at will.

27 is a discharge hopper supported by the main frame below the box screen 4. The walls of this hopper converge downwardly to a discharge aperture 28, below which is a discharge box 29, which may be supposed to lead away to any suitable destination. From the sides of the screen box 4 converge, upwardly, pieces 30, which form a roof or cover to prevent undue splashing, and to better direct the upper jets down into the box. Any suitable receptacle for the fruit may be placed at the foot of the machine to receive the contents from the screen box.

The operation of the apparatus is as follows: After the fruit has been subjected to the disintegrating solution, whereby its skin is broken and cut, to render it easy to remove, and after any other steps, which may be customary in the previous manipulation of the fruit, have been taken, the fruit having been led to the feed spout 23 falls therefrom upon the feed end of the screen box 4. In the type of processes to which I have reference, it is of great importance that the preliminary treatment with the lye be followed immediately by steps tending to avoid any excess of the effects of said treatment. The object, therefore, of the water jet nozzles 24 is to, at once, subject the fruit to the cooling and washing effect of cold water, so that the scalding or heating effect of the hot lye solution may be stopped and the lye itself in great part, removed. As the fruit falls from the feed spout 23, it is met by the water jets from the nozzles 24 and is cooled and washed. The fruit, now falling upon the screen bottom of the box 4 is agitated or shaken by the box, which has the shaking movement imparted to it heretofore described. This agitation, shaking or dancing to which the fruit is subjected has the triple effect of, first, advancing the fruit to its discharge from the lower end of the box, second, of occasioning sufficient friction, both between the individual specimens themselves and between them and the screen bottom and sides of the box to assist in removing the skin, and third, of presenting every portion of the fruit, at some time throughout the course of its travel, to the action of the water jets or sprays from the pipes 15 and 19. As the fruit travels through the box under the constant agitation or shaking described, the water jets or sprays from below and above serve to fully remove the particles of skin, which particles together with the water pass down through the screen bottom, and are directed by the hopper 27 through the discharge aperture 28 into the discharge box 29, by which they are led to the sewer or other place of disposition. During the course of the fruit through the box, it is thus subjected to the water, not only for the purpose of removing the skin, but of washing it and thoroughly cooling, rinsing and preparing it for canning. The disposition of the fan shape jets, crosswise of the box, and at intervals serves to assist the rolling and turning of the fruit, thereby causing it to present every part to the jets. At the discharge end or foot of the box, the now thoroughly washed and peeled fruit is delivered to any suitable receptacle, unnecessary herein to show or describe.

Having thus described my invention, what I claim as new and desire to secure by Letters Patent, is—

1. In an apparatus for treating fruit such as peaches, means for removing previously disintegrated skin from the fruit, including a support for the fruit, means for operating the support to shake the fruit, and means for directing peeling water jets upon said fruit while the same is being shaken.

2. In an apparatus for treating fruit such as peaches, means for removing previously disintegrated skin from the fruit including a flat substantially horizontal support for the fruit, means for operating the support to shake the fruit, and means for directing peeling water jets upon said fruit while the same is being shaken.

3. In an apparatus for treating fruit such as peaches, means for removing previously disintegrated skin from the fruit including a foraminous support for the fruit, means for operating the support to shake the fruit, and means for directing peeling water jets upon said fruit from both above and below said foraminated support while the fruit is being shaken.

4. In an apparatus for treating fruit such as peaches, means for removing previously disintegrated skin from the fruit including a substantially horizontal support for the fruit, means for operating the support to cause the fruit to advance over the surface thereof, and means for directing peeling water jets upon said fruit as it advances.

5. In an apparatus for treating fruit such as peaches, means for removing previously disintegrated skin from the fruit including a substantially horizontal foraminated support for the fruit, means for operating the support to cause the fruit to advance over the surface thereof, and means for directing peeling water jets upon said fruit from both above and below the foraminated support as the fruit advances.

6. In an apparatus for treating fruit such as peaches, means for removing previously disintegrated skin from the fruit including a substantially horizontal support for the fruit, instrumentalities for operating the support to shake the fruit and to cause the same to advance over the surface of the support, and means for directing peeling water jets upon said fruit while being shaken and advanced.

7. In an apparatus for treating fruit such as peaches, means for removing previously disintegrated skin from the fruit including a substantially horizontal foraminated support for the fruit, instrumentalities for operating the support to shake the fruit and to cause the same to advance over the surface of the support, and means for directing peeling water jets upon said fruit from both above and below the foraminated support while the fruit is being shaken and advanced.

8. In an apparatus for treating fruit such as peaches, means for removing previously disintegrated skin from the fruit including a foraminated support for the fruit, means for operating the support to shake the fruit, and means for directing peeling water jets through the foraminated support and upon said fruit while the same is being shaken.

9. In an apparatus for treating fruit such as peaches, means for removing previously disintegrated skin from the fruit including a substantially horizontal foraminated support for the fruit, means for operating the support to cause the fruit to advance over the surface thereof, and means for directing peeling water jets upon said fruit from below and through the foraminated support while the fruit is being shaken.

10. In an apparatus for treating fruit such as peaches, means for removing previously disintegrated skin from the fruit including a substantially horizontal foraminated support for the fruit, instrumentalities for operating the support to shake the fruit and to cause the same to advance over the surface of the support, and means for directing peeling water jets upon said fruit from below and through the foraminated support while the fruit is being shaken and advanced.

11. In an apparatus for treating fruit such as peaches, means for removing previously disintegrated skin from the fruit including a support for the fruit, means for operating the support to shake the fruit, and means for directing peeling water jets upon said fruit while the fruit is being shaken, in combination with means for feeding the fruit to the support, and means for directing a water jet upon the fruit while falling from the feeding means to the support.

12. In an apparatus for treating fruit such as peaches, means for removing previously disintegrated skin from the fruit including a support for the fruit, and means for directing peeling water jets upon said fruit while on said support, in combination with means for feeding the fruit to the support, and means for directing a water jet upon the fruit while falling from the feeder to the support.

13. In an apparatus for removing previously disintegrated skin from fruit, the combination of a device having means for supporting, shaking and advancing the fruit, and a water pipe extending in the direction of the travel of the fruit and having cross-wise slits at intervals adapted to direct peeling water jets upon the fruit in planes transversely of its travel.

14. In an apparatus of the character described, means for removing previously disintegrated skin from fruit including a support for the fruit, means for operating the support to cause the fruit to shake thereon, and means for directing water in fan-like peeling jets upon said fruit.

15. In an apparatus of the character described, means for removing previously disintegrated skin from fruit including a support for the fruit, means for operating the support to cause the fruit to advance over the surface thereof, and means for directing water in fan-like peeling jets upon the fruit in planes running transversely to the direction of travel of the fruit over its support.

16. In an apparatus for treating fruit such as peaches, means for removing previously disintegrated skin from the fruit, including a support for the fruit, means for effecting a change of position of the fruit on said support, and means for directing peeling water jets upon said fruit.

17. In an apparatus for treating fruit such as peaches means for removing previously disintegrated skin from the fruit including a support for the fruit having a screen bottom, means for agitating said support, and means for directing peeling water jets to the fruit upon the support.

18. In an apparatus for removing the previously disintegrated skin from fruit, the combination with means for supporting and advancing the fruit, of means for directing a peeling water jet upon said fruit as it advances.

19. In an apparatus for removing the previously disintegrated skin from fruit, the combination with means for supporting and advancing the fruit, of means for directing peeling jets of water at intervals upon said fruit as it advances.

20. In an apparatus for removing the previously disintegrated skin from fruit, the combination with means for supporting and advancing the fruit, of means for directing peeling jets of water at intervals upon said fruit from above and below as it advances.

21. In an apparatus for removing the previously disintegrated skin from fruit, the combination of means for shaking said fruit, with means for directing a peeling water jet upon the fruit while being shaken.

22. In an apparatus for removing the previously disintegrated skin from fruit, the combination of means for shaking said fruit, with means for directing peeling water jets upon the fruit from above and below while being shaken.

23. In an apparatus for removing the previously disintegrated skin from fruit, the combination of means for shaking and advancing the fruit, with means for directing peeling jets of water at intervals upon said fruit while advancing and being shaken.

24. In an apparatus for removing the previously disintegrated skin from fruit, the combination of means for shaking and advancing the fruit, with means for directing peeling jets of water at intervals upon said fruit from above and below, while advancing and being shaken.

25. In an apparatus for removing the previously disintegrated skin from fruit, the combination of a shaking box to which the fruit is fed, and means for directing peeling jets of water upon said fruit while in the box.

26. In an apparatus for removing the previously disintegrated skin from fruit, the combination of a box, means for feeding said fruit to the box at one end, means for shaking the box to shake the fruit therein and cause its advance to the other end, and means for directing peeling jets of water upon said fruit at intervals as it travels through the box.

27. In an apparatus for removing the previously disintegrated skin from fruit, the combination of a shaking box having a screen bottom upon which the fruit is supported and shaken, and means below said box for directing peeling water jets through the screen bottom upon the fruit.

28. In an apparatus for removing the previously disintegrated skin from fruit, the combination of a box having a screen bottom, means for feeding said fruit to the box at one end, means for shaking the box to shake the fruit therein and cause its advance to the other end, and means below said box for directing peeling jets of water through the screen bottom upon said fruit at intervals as it travels through the box.

29. In an apparatus for removing the previously disintegrated skin from fruit, the combination of a shaking box having a screen bottom upon which the fruit is supported, shaken and advanced, means below said box for directing peeling water jets through the screen bottom upon the fruit as it advances through the box, and means above said box for directing jets of water from above upon the fruit in the box.

30. In an apparatus for removing the previously disintegrated skin from fruit, the combination of a support for the fruit, means for feeding the fruit to said support, means for directing a peeling jet of water upon the fruit while falling from the feeder to the support, and means for directing a peeling jet of water upon the fruit while on said support.

31. In an apparatus for removing the previously disintegrated skin from fruit, the combination of a shaking box to support and advance the fruit, an overlying spout to feed the fruit to said box, and a nozzle disposed to direct a peeling jet of water upon the fruit while falling from the spout to the box.

32. In an apparatus for removing the previously disintegrated skin from fruit, the combination of a shaking box having a screen bottom to support and advance the fruit, a spout adapted to feed the fruit to the box, a nozzle disposed to direct a water jet upon the fruit while falling from the spout to the box, and means for directing peeling water jets at intervals upon the fruit as it passes through the box.

33. In an apparatus for removing the previously disintegrated skin from fruit, the combination of a shaking box for supporting, shaking and advancing the fruit, and a water pipe extending in the direction of the travel of the fruit of said box and having crosswise slits at intervals adapted to direct peeling water jets upon the fruit in planes transversely of its travel.

In witness whereof I have hereunto set my hand.

HERMANUS ALBERT BEEKHUIS.

Witnesses:
 A. RUBENSTEIN,
 A. C. THORNTON.